United States Patent Office 3,153,008
Patented Oct. 13, 1964

3,153,008
AROMATIC CARBONATE RESINS AND
PREPARATION THEREOF
Daniel W. Fox, Schenectady, N.Y., assignor to General Electric Company, a corporation of New York
No Drawing. Filed July 5, 1955, Ser. No. 520,166
10 Claims. (Cl. 260—47)

This invention relates to aromatic carbonate resins having excellent physical, chemical and electrical properties and to the preparation of these resins. More particularly, this invention relates to a linear polymer comprising recurring structural units of the formula (I) 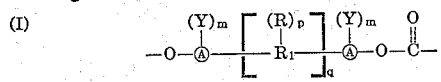

where R is a monovalent hydrocarbon radical; $R_1$ is selected from the group consisting of an alkylene and an alkylidene residue; A is the residue of an aromatic nucleus; Y is a chemical constituent selected from the group consisting of (a) inorganic atoms (b) inorganic radicals and (c) organic radicals; m is a whole number equal to from 0 to a maximum determined by the number of replaceable nuclear hydrogens substituted on the aromatic hydrocarbon residue A; p is a whole number equal to from 0 to a maximum determined by the number of replaceable hydrogens on $R_1$; and q is a whole number equal to from 0 to 1 inclusive.

Many resins presently available on the market have found eminent use in the thermoplastic resin art. However, no one of these thermoplastic resins has all the desirable physical, mechanical, chemical, electrical and thermal properties sought in a resin. In general, it has been found that certain thermoplastic resins, such as nylon, may have good mechanical strength characteristics, as well as good resistance to heat distortion and high melting points; however, the stability of nylon in the presence of certain chemical reagents and its electrical properties often leaves much to be desired. Similarly, other types of thermoplastic resins, such as polyethylene, polyvinyl chloride, polymethylmethacrylate, etc., may have a few of the more desirable properties but not all of such properties.

Unexpectedly, I have discovered that resins defined in Formula I possess all of the desired physical, chemical and electrical properties at the same time. More particularly, I have found these resins possess high tensile strength as well as exceptional impact and flexural strengths, have high heat distortion temperatures as well as high melting points, are of low density, are almost water-white in appearance, and, in addition, are exceptionally stable in the presence of water and chemical reagents, such as acids and bases. In addition, my resinous compositions have good resistance to heat and exhibit outstanding resistance to thermal degradation in oxidative environments, while possessing at the same time good electrical properties, such as low power factor, low dielectric constant, high surface and volume resistivity, high arc resistance, high dielectric strength, etc. In addition, the materials from which my resinous compositions are prepared have the desirable economic advantage in that they are readily available and are attractively inexpensive. Thus, aromatic carbonate resins within the scope of Formula I have been prepared which possess the following excellent properties:

Tensile strength _____ 10,000 p.s.i.
Flexural strength _____ 16,000 p.s.i. (Dynstat).
Impact strength _____ Greater than 2.0 ft. lbs. (Dynstat).
Melting point _____ 300° C.
Heat distortion _____ 146–7° C. (modified Dynstat).
Density _____ 1.200 at 20° C.
Elongation _____ 50–120%.
Power factor _____ 60 cycle 0.008, 1 m.c. 0.009.
Dielectric constant _____ 60 cycle 3.0, 1 m.c. 2.8.
Dielectric strength _____ 25° C.—S/T—1000 v./m., 100° C.—S/T—1200 v./m.
Arc resistance _____ 127–150 seconds.
Surface resistivity _____ Greater than $6 \times 10^{14}$ ohms.
Volume resistivity _____ Greater than $6 \times 10^{15}$ ohms.

All of the above properties were measured at room temperature unless otherwise specified. Terms used above and throughout this specification have the following meanings: p.s.i., pounds per square inch; ft. lbs., foot pounds; m.c., megacycles; S/T, short time (about 40 seconds); v./m., volts per mil. Tensile strengths and elongations were determined on a Scott Tester using a 64 x 124 mil bar and a 12 inch per minute drawing rate. Flexural and impact strengths were measured on a Dynstat Tester and heat distortion was determined on Dynstat pieces by the standard ASTM test modified as described herein in Example 2. Electrical measurements were carried out on samples about 32 mils thick.

A method of preparing these resins comprises effecting reaction between (1) a dihydroxydiaryl compound of the formula (II) 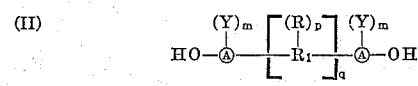

and (2) a diaryl carbonate of the formula (III) 

where R is a monovalent hydrocarbon radical; $R_1$ is selected from the group consisting of an alkylene and an alkylidene residue; A is the residue of an aromatic nucleus; Y and Z are chemical substituents selected from the group consisting of (a) inorganic atoms, (b) inorganic radicals and (c) organic radicals, (a), (b) and (c) being inert to and unaffected by the reactants and by the reaction of the dihydroxydiaryl compound and the diaryl carbonate; m and n are whole numbers equal to from 0 to a maximum equivalent to the number of replaceable nuclear hydrogens substituted on the aromatic hydrocarbon residue A; p is a whole number equal to from 0 to a maximum determined by the number of replaceable hydrogens on the alkylene or alkylidene residue; and q is a whole number equal to from 0 to 1 inclusive.

In the above formula for the dihydroxydiaryl compound (hereinafter employed as a designation for the compound defined in Formula II), the inert substituents designated by Y on each aromatic hydrocarbon residue may be the same or different, and R's may also be the same or different; the number of Y's on each respective aromatic hydrocarbon nucleus residue A may also be varied if desired so that a symmetrical or an unsymmetrical compound be formed. The Z's in the diaryl carbonate defined by Formula III may also be the same or different, and the number of substituents represented by Z may be the same on each aromatic nucleus A, or may vary depending upon the degree of substitution desired on each aromatic residue A.

Among the monovalent hydrocarbon radicals which R may represent are, for instance alkyl radicals (e.g., methyl, ethyl, propyl, isopropyl, butyl, decyl, etc.), aryl radicals (e.g., phenyl, naphthyl, biphenyl, tolyl, xylyl, ethylphenyl etc.), aralkyl radicals (e.g., benzyl, phenylethyl, etc.), cycloaliphatic radicals, (e.g., cyclopentyl, cyclohexyl, etc.), as well as monovalent hydrocarbon radicals containing inert substituents thereon, for instance, halogens (e.g., chlorine, bromine, flourine, etc.). Among the aromatic nuclei which A may represent are, for instance, the aromatic hydrocarbon residues based on benzene, biphenyl, naphthalene, anthracene, etc. The final configuration of this aromatic hydrocarbon residue in the molecule is determined by the nuclearly-substituted hydroxyl groups, together with any nuclearly-substituted hydrogen atoms and the number of inert substituents represented by either Y or Z.

Examples of $R_1$ as an alkylene or alkylidene residue are, for instance, methylene, ethylene, propylene, propylidene, isopropylidene, butylene, butylidene, isobutylidene, amylene, isoamylene, amylidene, isoamylidene, etc. When $p$ is zero, the valence requirements of carbon skeleton of the alkylene or alkylidene residue are completely satisfied with hydrogens. When $p$ is greater than zero, hydrogens fulfill the valence requirements of the carbon skeleton not satisfied by the R's.

Among the inert substituents which Y and Z may represent are, for instance, halogens (e.g., chlorine, bromine, fluorine, etc.); organoxy radicals of the formula OW, where W is a monovalent hydrocarbon radical similar to those recited for R; and monovalent hydrocarbon radicals of the type represented by R. Other inert substituents included within the scope of Y and Z, such as the nitro group, may be substituted on the aromatic nuclear residue A without departing from the scope of the invention.

In the above formulae, $m$ and $n$ may be zero whereby the aromatic nuclear residues A will be unsubstituted except for the hydroxyl group in regard to Formula II, or else there may be a plurality of substitutions of inert substituents on the aromatic nuclear residues depending upon the number of nuclearly bonded hydrogens remaining on A, taking into consideration the presence of the hydroxyl group in Formula II. Where $q$ is zero the aromatic nuclei will be directly joined without the presence of an alkylene or an alkylidene bridge.

The positions of the hydroxyl groups, Y and Z on the aromatic nuclear residue A, may be varied in the ortho, meta or para positions, and the groupings may be in a vicinal, asymmetrical, or symmetrical relationship, where two or more of the nuclearly-bonded hydrogens of the aromatic hydrocarbon residue are substituted with, for instance, Y, and the hydroxyl group in Formula II.

In general, the aromatic carbonate resins of the instant invention can be prepared by interaction between the reactants at elevated temperatures of from about 150° C. to 300° C. or higher for times varying from about 1 to 15 or more hours under such conditions that an ester interchange occurs whereby, concurrently with the heating, there is removed from the reaction mixture a composition having the formula (IV) 

where A, Z and $n$ have the meanings given above. This ester interchange evolution of the hydroxyaryl compound (represented by Formula IV) is advantageously carried out at sub-atmosphere pressure, for instance, at reduced pressures of around 0.01 to 5 to 10 mm. of mercury, preferably while blanketing the reaction mixture with a non-oxidizing or an inert atmosphere such as hydrogen or nitrogen, neon, krypton, etc., to prevent undesirable oxidative effects especially under such conditions where extremely high reaction temperatures are employed under moderate sub-atmospheric pressures. The use of atmospheric and superatmospheric pressure is, however, not precluded. Heating under vacuum after the ester exchange is substantially completed (hereafter called vacuum cooking), for example at from 150–300° C. at 0.01 to 5–10 mm. for extended periods of time, tends to increase the molecular weight and viscosity of the carbonate resin.

Although the reaction can be carried out in the absence of a catalyst, one may, if desired, use the usual ester exchange catalysts, for instance, metallic lithium, potassium, calcium, beryllium, magnesium, zinc, cadmium, aluminum, chromium, molybdenum, iron, cobalt, nickel, chromium, silver, gold, tin, antimony, lead, barium, strontium, platinum, palladium, etc., compounds thereof, such as alcoholates, oxides, carbonates, acetates, hydrides, etc. Additional catalysts and variations in the ester exchange methods are discussed in Groggins, "Unit Processes in Organic Synthesis" (4th Ed. McGraw-Hill Book Co., 1952), pages 616-620. The amount of such catalyst is usually quite small and is of the order of 0.001 to 0.1%, by weight, based on the total weight of the reactants.

Although equimolar ratios of the diaryl carbonate and the dihydroxydiaryl compound or excesses of either reactant can be used to make the resinous compositions of the instant invention, an excess (based on molecular equivalents—hereafter called molar excess) of the diaryl carbonate is preferred since products of higher molecular weights and viscosities can be more easily obtained with excess diaryl carbonates. Thus, I have employed the diaryl carbonate and the dihydroxydiaryl compound in essentially molar equivalents or in molar concentrations which are almost equal using for each mole of the dihydroxydiaryl compound from about 0.98 to about 1.02 moles of the diaryl carbonate, or larger molar excesses of the diaryl carbonate, for instance, by employing, for each mole of the dihydroxydiaryl compound, from about 1.05 to 1.5 moles or more of the diaryl carbonate. Molar excesses of the dihydroxydiaryl compound can also be employed, particularly when the dihydroxydiaryl compound is more volatile than the diaryl carbonate As a result of the reaction between the diaryl carbonate and the dihydroxydiaryl compound, there is obtained a linear polymer comprising recurring structural units of the formula

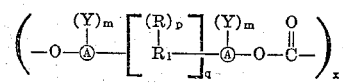

where R, $R_1$, A, Y, $m$, $p$ and $q$ have the meanings given above and $x$ is a whole number equal to at least 1 and may be as high as 30 or more. Regardless of the molar ratios employed, novel useful thermoplastic resinous materials are obtained which have good thermal resistance, high heat distortion temperature, extremely high mechanical strength, and excellent electrical characteristics, etc.

In order that those skilled in the art may better understand how the present invention may be practiced, the following examples are given by way of illustration and not by way of limitation. All parts are by weight. When the temperature of the oil bath is given rather than the temperature of the reaction mixture, the temperature of the latter is at most 5–10° C. lower.

*Example 1*

This example is illustrative of the reaction of equimolar ratios of technical grades of Bisphenol-A and diphenyl carbonate.

Equimolar ratios of Bisphenol-A, (VI) 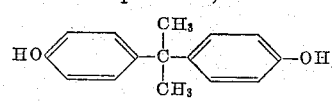

(114 parts) and diphenyl carbonate, (VII) 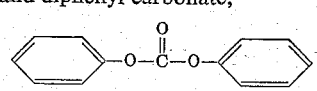

(107 parts), were charged to an oil bath heated reactor equipped with a stirrer, an inert gas inlet, a condenser-receiver system connected to a vacuum means for creating subatmospheric pressure. Nitrogen was slowly allowed to enter the reactor system to which vacuum was gradually applied. Initial distillation of phenol began when the bath temperature reached 185–190° C. (after ½ hr. of heating), and continued rapidly for 1–1.5 hrs. at this temperature and a pressure of 10 mm. during which time most of the phenol was evolved. The temperature of the heating bath was then slowly raised to 290° C. under the nitrogen-reduced pressure system (about 10 mm.) and held at this point for about 5 additional hours during which time the viscosity of the reaction mixture increased. Long fibers could be drawn from the hot melt. The carbonate resin product (melting point 280–300° C.) comprised recurring units of the formula (VIII) 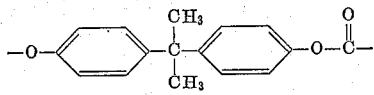

The resin had an intrinsic viscosity of 0.355 as determined in p-dioxane at a temperature of $30.3 \pm 0.1°$ C. using an Ostwald viscometer, hereafter referred to as "p-dioxane $30.3 \pm 0.1°$ C."

*Example 2*

This example is illustrative of the reaction of equimolar ratios of Bisphenol-A and diphenyl carbonate wherein recrystallized reagents are employed.

An oil bath heated reactor equipped with a stirrer, a distilling head-condenser system connected to a vacuum means was charged with 68.4 g. (0.3 mole) of Bisphenol-A recrystallized from a methanol water mixture (1:1 by volume) and 64.2 g. (0.3 mole) diphenyl carbonate recrystallized from methanol. After one hour of heating, the temperature of the oil heating bath was 205° C. Distillation began when the pressure was lowered to 20 mm. During the next 1.75 hours the temperature of the oil bath was raised to 240° C. and the pressure on the system was lowered to 9 mm. during which time the rate of distillation diminished. Thereupon the oil bath temperature was raised to 285° C. while the pressure was lowered to 0.1 mm. for an additional hour. Then the resin was vacuum cooked for 5 additional hours at 285–295° C. (bath) under 0.1–0.6 mm. pressure.

The resin produced in Example 2 had the following properties. All measurements, except where otherwise specified, were at room temperature.

| | |
|---|---|
| Tensile strength | p.s.i.  6,600 |
| Flexural strength (Dynstat) | p.s.i.  8,100 |
| Impact strength (Dynstat) | ft. lb.  0.1–0.6 |
| Heat distortion [1] (modified Dynstat) | ° C.  125 |
| Density (20° C.) | 1.200 |
| Intrinsic viscosity (p-dioxane $30.3 \pm 0.1°$ C.) | 0.44 |

[1] The heat distortion temperatures were determined by a modified ASTM test. Dynstat pieces (1/8″ x 3/8″ x 5/8″) were used instead of the standard 1/2″ x 1/2″ x 5″ bar and the weight was 5 kilograms instead of 2½ kilograms. Heating was at the rate of 2–3° C. per minute. This test as herein used will hereafter be referred to as "modified Dynstat."

*Example 3*

This example is illustrative of the reaction of Bisphenol-A with 10% molar excess of diphenyl carbonate.

A mixture of 68.4 parts (0.30 mole) of Bisphenol-A recrystallized from a methanol-water mixture (1:1 by volume) and 70.6 parts (0.33 mole) of diphenyl carbonate recrystallized from methanol was placed in an oil bath heated reaction vessel equipped with a stirrer, a distilling head-condenser system connected to a vacuum means. As the reaction mixture was heated and stirred, phenol began to distill at a bath temperature of 199° C. and a pressure of 22 mm. about 1.5 hours being required to bring the oil bath to 199° C. During the next hour the bath temperature rose to 205° C. during which time a slow reduction of pressure to 0.3 mm. was begun. Distillation of the phenol was substantially complete at the end of this time. When the pressure reached 0.3 mm. the bath temperature was gradually raised to 285° C. over a 1.5 hour period. Refluxing was noted as the excess diphenyl carbonate was removed. The resin was then vacuum cooked for approximately 4 hours at 0.2–0.3 mm. at a bath temperature of 290° C.

The polymeric product thus prepared was very viscous at a temperature of 290° C. At room temperature it was a flexible, tough, strong polymer. Cold drawn fibers were prepared from this product.

The polymer produced in Example 3 had the following properties. All measurements, except when otherwise specified, were at room temperature.

| | |
|---|---|
| Tensile strength | 10,000 p.s.i. |
| Flexural strength (Dynstat) | 15,300 p.s.i. |
| Impact strength (Dynstat) | Greater than 1.00 ft. lb. |
| Heat distortion (modified Dynstat) | 143°–146° C. |
| Density (20° C.) | 1.200. |

In addition this polymer (Example 3) had the following electrical properties. The electrical properties were determined using a piece of resin 5″ x 5″ x .032″.

| | |
|---|---|
| Power factor | 60 cycles 0.008, 1 megacycle 0.009. |
| Dielectric constant | 60 cycles 3.04, 1 megacycle 2.90. |
| Dielectric strength | 25° C.—S/T (29–30 kv.) 922 v./m., 100° C.—S/T (29–32 kv.) 953 v./m. |
| Surface resistivity | Greater than $6 \times 10^{14}$ ohms. |
| Volume resistivity | Greater than $6 \times 10^{15}$ ohms. |
| Arc resistance | 95–155 seconds. |

*Example 4*

This example is illustrative of the reaction of Bisphenol-A with 15% molar excess of diphenyl carbonate.

A stainless steel reactor was equipped with stirrer, inert gas inlet, a condenser-receiver system connected to a vacuum means, and an electrical heating unit. To this reactor was added 274 parts of Bisphenol-A (1.2 moles) recrystallized from methanol-water (1:1 by volume) and 295 parts of diphenyl carbonate (1.38 moles) recrystallized from methanol. The temperature of the well-stirred reaction mixture was raised to 173° C. in about 1.5 hours, the reactor being held at a pressure of about 10 mm., at which temperature and pressure phenol started to distill. The temperature of the mixture was held at 175° C. for 5 additional hours while the pressure on the system was gradually reduced to about 0.07 mm. After this period, the resin temperature was raised to 263° C. at 0.07 mm. pressure wherein during 7.5 hours at this temperature and pressure most of the excess diphenyl carbonate had distilled from the reaction mixture. At this point, vacuum-cooking at 260–265° C. at 0.06–0.08 mm. was carried on for an additional 7.5 hours.

The resin produced had an intrinsic viscosity of 0.86 (p-dioxane $30.3 \pm 0.1°$ C.) and a heat distortion (modified Dynstat) of 148–152° C. The impact strength for this resin was greater than the Dynstat Tester's capacity (1.94 ft. lbs.).

While the reaction product of Bisphenol-A and diphenylcarbonate comprises the preferred embodiment, carbonate resins have been prepared from other dihydroxydiaryl compounds.

*Example 5*

One mole of compound having the following structure, (IX) 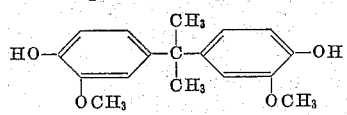

(288 parts) was reacted with one mole of diphenyl carbonate (214 parts) in the manner described in Example 1. A viscous product was produced which solidified on cooling. Long fibers could be drawn from the hot melt. The product was a carbonate resin comprising recurring units of the formula (X) 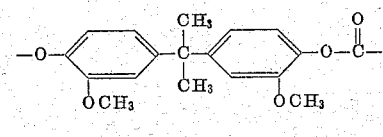

Example 6

One mole of a compound having the following structure, (XI)
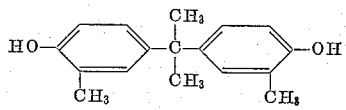

(256 parts) was reacted with one mole of diphenyl carbonate (214 parts) in the manner of Example 1. A viscous produce was formed which solidified on cooling. Long fibers could be drawn from the hot melt. The product was a carbonate resin comprising recurring units of the formula (XII)
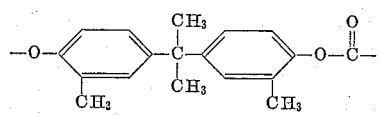

Example 7

This example illustrates the reaction of a dihydroxydiaryl compound with a 50% molar excess of diphenyl carbonate. A compound having the following formula

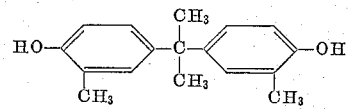

(52 parts, 0.2 mole) and diphenyl carbonate (64 parts, 0.3 mole) were charged to a reactor containing an inert gas inlet, a condenser-receiver-system connected to vacuum means, the reactor being heated in an oil bath. A slow flow of nitrogen through a capillary immersed in the reaction mixture served the dual purpose of blanketing from air and means for agitation as vacuum was applied to the reactor (1 mm.). The oil bath temperature was raised to 200° C. over a period of ¾ hour. Distillation of the phenol commenced during this period. After about 1 hour at 200° C. (bath) at about 1 mm. pressure, the temperature of the bath was gradually raised over a 2 hour period to 300° C. with alternating full vacuum (less than 1 mm.) and vacuum-nitrogen combination. Thereupon, the product was vacuum cooked at less than 1 mm. pressure an additional 3 hours at 300° C. The viscous product solidified on cooling. Fibers, drawn from the reaction mixture, could be cold drawn.

The presence of ortho groups (relative to the hydroxy group) on the dihydroxydiaryl moiety of the carbonate resin imparts high alkaline stability to the final product. For example, the product of Example 7 was boiled with aqueous alkaline for long periods of time without degradation. These ortho substituted resins also exhibit high hydrolytic stability, for example, a portion of this same resin (Example 7) was sealed in a tube with water and heated at 130° C. for several days with no apparent degradation.

In addition to the specific reactants described above, other diaryl carbonates and dihydroxydiaryl compounds can be employed. Examples of other carbonate esters comprise symmetrical carbonates, for example di-(halophenyl) carbonates, e.g., di-(chlorophenyl) carbonate, di-(bromophenyl) carbonate; di-(polyhalophenyl) carbonates, e.g., di-(trichlorophenyl) carbonate, di-(tribromophenyl) carbonate, etc.; di-(alkylphenyl) carbonates, e.g., di-(tolyl) carbonate, etc., di-(naphthyl) carbonate, di-(chloronaphthyl) carbonate, etc.; unsymmetrical carbonates for example, phenyl tolyl carbonate, chlorophenyl chloronaphthyl carbonate, trichlorophenyl chlorotolyl carbonate, etc. Mixtures of the foregoing carbonate esters can also be employed.

These diaryl carbonates can be prepared by the methods described in A. F. Holliman et al., Rec. Trav. Chem. 36, 271 (1916) and Copisarow, J. Chem. Soc. (Brit.) 1929, 251, both of whom disclose preparing dicresyl carbonate by treating the alkali metal salts of p-cresol with phosgene, and U.S. Patent 2,362,865—Tryon et al., which discloses preparing diphenyl, ditolyl, and dinaphthyl carbonates by passing phosgene through a column of the phenol in the presence of a catalyst, etc.

Examples of dihydroxydiaryl compounds that may be be employed in this invention comprise bis-(4-hydroxyphenyl),
2,4'-dihydroxydiphenyl,
2,4'-dihydroxydiphenyl methane,
bis-(2-hydroxyphenyl) methane,
bis-(4-hydroxyphenyl) methane,
bis-(4-hydroxy-5-nitrophenyl) methane,
bis-(4-hydroxy-2,6-dimethyl-3-methoxyphenyl) methane,
1,1-bis-(4-hydroxyphenyl) ethane,
1,2-bis-(4-hydroxyphenyl) ethane,
1,1-bis-4-hydroxy-2-chlorophenyl) ethane,
1,1-bis-(2,5dimethyl-4-hydroxyphenyl) ethane,
1,3-bis-(3-methyl-4-hydroxyphenyl) propane,
2,2-bis-(3-phenyl-4-hydroxyphenyl) propane,
2,2-bis-(3-isopropyl-4-hydroxyphenyl) propane,
2,2-bis-(4-hydroxynaphthyl) propane,
2,2-bis-(4-hydroxyphenyl) butane,
1,4-bis-(4-hydroxyphenyl) butane,
2,2-bis-(4-hydroxyphenyl) pentane,
3,3-bis-(4-hydroxyphenyl) pentane,
2,2-bis-(4-hydroxyphenyl) heptane,
bis-(4-hydroxyphenyl)-phenyl methane,
bis-(4-hydroxyphenyl)-cyclohexyl methane,
1,2-bis-(4-hydroxyphenyl)-1,2-bis-(phenyl) ethane,
2,2-bis-(4-hydroxyphenyl) 1,3-bis(phenyl) propane,
2,2-bis(4-hydroxyphenyl)-1-phenyl propane, and the like.

Mixtures of the foregoing dihydroxydriaryl compounds can also be used to produce carbonate resins containing a plurality of dihydroxydiaryl moieties.

An example of a dihydroxydiaryl compound prepared from a halogenated phenol is 2,2-bis-(3-chloro-4-hydroxyphenyl) propane, prepared by reacting o-chlorophenol with acetone. Halogenation of the dihydroxydiaryl compounds in the prior paragraph may be readily controlled so as to introduce the desired number of halogen atoms in each aryl nucleus, by the method of Zinch et al., Ann. 343, 75–131 (1905), or Moss, British Patent 491,792. Dihydroxydiaryl compounds can be prepared in the manner described in U.S. Patents 2,182,308—Britton et al., 2,191,831—Perkins, and 2,468,982—Jansen.

Because of their excellent physical, mechanical, chemical, electrical and thermal properties the products of this invention have many and varied uses. For example, they can be used in molding powder formulations, either alone, or by mixing them with various fillers such as wood flour, diactomaceous earth, carbon black, silica, etc., to make molded parts such as spur, helical, worm or bevel gears, ratchets, bearings, cams, impact parts, gaskets, valve seats for high pressure oil and gas systems or other chemical fluids requiring resistance to chemicals, etc.

Films of these products prepared by calendering or extrusion (either orientated or not) are useful as metal or fiber liners, containers, covers, closures, electrical insulating tapes, in sound recording tapes, pipe coverings, etc. Because of their chemical inertness, tubing of these materials can be used to transport chemicals, such as acids and bases, which might be deleterious to other resins. Because of their chemical, physical and thermal properties they may be used as surface coating for such apparatus as refrigerators, washing machines, cooking ovens, etc. Additional uses are as rods, wire coating, wire enamels, slot insulations in dynamoelectric machines, fibers, etc. These resins can also be employed in varnish and paint formulations and as bonding material for metallic or fibrous laminates. The carbonate resins of the present invention may be mixed with various fillers, modifying agents, etc. such as dyes, pigments, stabilizers, plasticizers, etc.

Copolymers of dihydroxydiaryl compounds are also included within the scope of this invention, e.g., carbonate resins wherein a plurality of dihydroxydiaryl moieties are contained within the same carbonate resin such as the product formed from the simultaneous reaction of mixtures of a plurality of dihydroxydiaryl compounds with a diaryl carbonate, etc.; for example, the carbonate resins formed by reacting a mixture of Bisphenol-A and bis-(4-hydroxyphenyl) with diphenyl carbonate or the carbonate resins formed by reacting mixtures of other dihydroxydiaryl compounds with diaryl carbonates.

The foregoing detailed description has been given for clearness of understanding only and no unnecessary limitations are to be understood therefrom. The invention is not limited to the exact details shown and described for obvious modifications will occur to those skilled in the art.

What I claim as new and desire to secure by Letters Patent is:

1. A linear, high molecular weight, high tensile and flexural strength thermoplastic polycarbonate possessing an impact strength greater than about one-half ft.-lb. at room temperature, a heat distortion temperature of at least about 125° C. and a melting point of about 280 to 300° C. prepared by reacting at elevated temperatures under ester exchange conditions, a compound of the formula

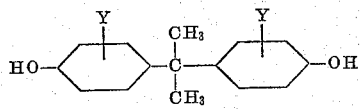

where Y is a member selected from the class consisting of hydrogen atoms, halogen atoms and alkyl hydrocarbon radicals, with equimolar amounts of compound of the formula

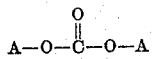

where A is a monovalent aromatic radical.

2. A linear, high molecular weight, high tensile and flexural strength thermoplastic polycarbonate possessing a heat distortion temperature of at least about 125° C. which consists essentially of recurring units of the formula

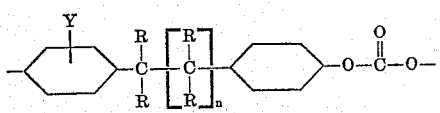

wherein Y is a member selected from the class consisting of hydrogen atoms, halogen atoms and alkyl hydrocarbon radicals; R is a member selected from the class consisting of hydrogen atoms and alkyl hydrocarbon radicals; and n is a whole number from one to four, inclusive.

3. A linear, high molecular weight, high tensile and flexural strength thermoplastic polycarbonate possessing a heat distortion temperature of at least about 125° C. which consists essentially of recurring units of the formula

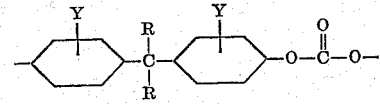

wherein Y is alkoxy and R is selected from the class consisting of hydrogen atoms and alkyl hydrocarbon radicals.

4. A linear, high molecular weight, high tensile and flexural strength thermoplastic polycarbonate possessing a heat distortion temperature of at least about 125° C. which consists essentially of recurring units of the formula

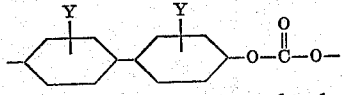

wherein Y is a member selected from the class consisting of hydrogen atoms, halogen atoms and alkyl radicals.

5. A process for preparing a linear, high molecular weight, high tensile and flexural strength thermoplastic polycarbonate which comprises reacting at elevated temperatures under ester exchange conditions a dihydric phenol of the formula

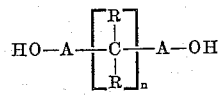

wherein A is a divalent aromatic radical; R is selected from the class consisting of hydrogen atoms and alkyl hydrocarbon radicals and n is a whole number from zero to five, inclusive, with equimolar amounts of a carbonate ester of the formula

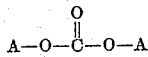

wherein A is a monovalent aromatic radical.

6. The process of claim 5 in which an excess, based on molecular equivalents, of the carbonate ester is used.

7. The process of claim 5 in which the dihydric phenol is a compound of the formula

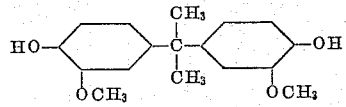

8. The process of claim 5 in which the dihydric phenol is a compound of the formula

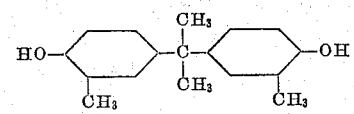

9. The process for preparing a linear, high molecular weight, high tensile and flexural strength thermoplastic polycarbonate which comprises reacting at elevated temperatures under ester exchange conditions a dihydric phenol of the formula

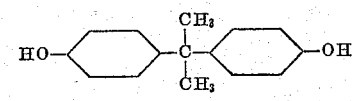

with equimolar amounts of diphenyl carbonate.

10. The process of claim 9 in which an excess, based on molecular equivalents, of the diphenyl carbonate is used.

References Cited by the Examiner

UNITED STATES PATENTS

| | | | |
|---|---|---|---|
| 1,995,291 | 3/35 | Carothers | 260—77.5 |
| 2,035,578 | 3/36 | Wagner | 260—77.5 |
| 2,058,394 | 10/36 | Arvin | 260—47 |
| 2,210,817 | 8/40 | Peterson | 260—77.5 |
| 2,455,652 | 12/48 | Bralley et al. | 260—77.5 |
| 2,455,653 | 12/48 | Bralley et al. | 260—77.5 |
| 2,536,989 | 1/51 | Glahn et al. | 260—77.5 |
| 2,595,343 | 5/52 | Drewitt et al. | 260—47 |
| 2,789,969 | 4/57 | Reynolds et al. | 260—77.5 |
| 2,997,459 | 8/61 | Schnell et al. | 260—47 |
| 3,028,365 | 4/62 | Schnell et al. | 260/47 X |

OTHER REFERENCES

Einhorn: "Liebig's Annalen der Chemie," vol. 300, pages 135–155 (1898).

References Cited by the Applicant

UNITED STATES PATENTS 2,379,250   6/45   Muskat et al.

OTHER REFERENCES

Bischoff et al.: Ber. 35, 3431 (1902).

WILLIAM H. SHORT, *Primary Examiner.*

M. STERMAN, P. E. MANGAN, L. N. BURSTEIN, *Examiners.*